M. B. DISKIN.
WATER HEATER.
APPLICATION FILED OCT. 28, 1911.
1,049,461.
Patented Jan. 7, 1913.
2 SHEETS—SHEET 1.
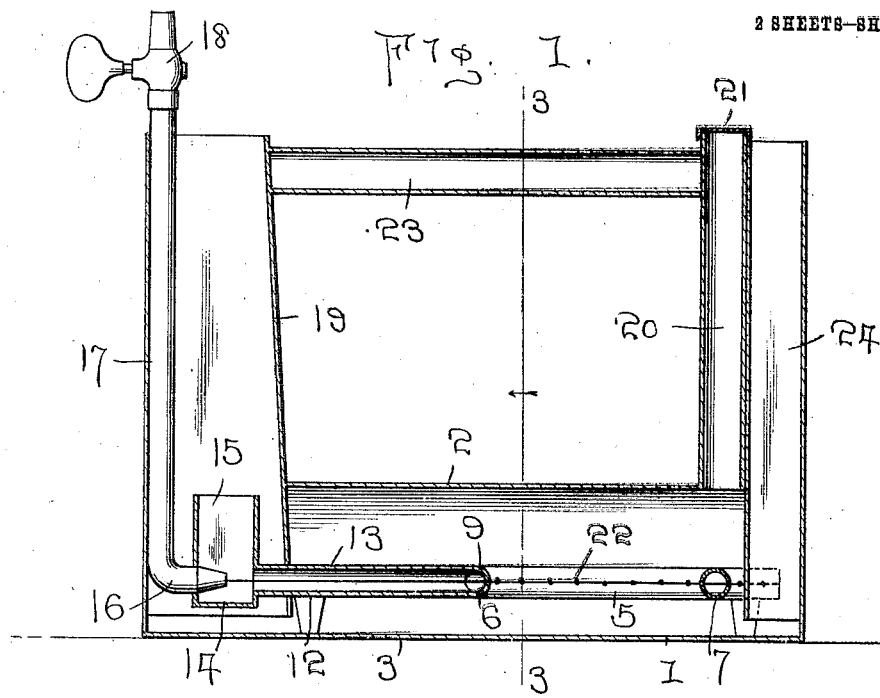
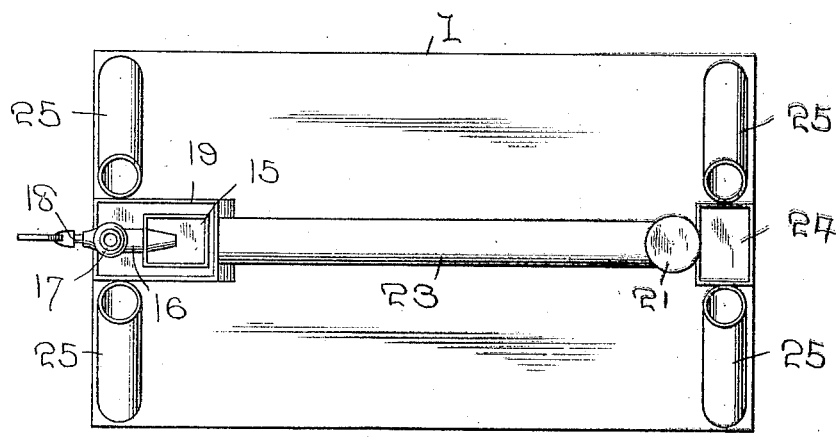
WITNESSES:
Thos. W. Riley
M. Newcomb
INVENTOR
M. B. Diskin
BY W. J. FitzGerald
Attorneys M. B. DISKIN.
WATER HEATER.
APPLICATION FILED OCT. 28, 1911.
1,049,461.
Patented Jan. 7, 1913.
2 SHEETS—SHEET 2.
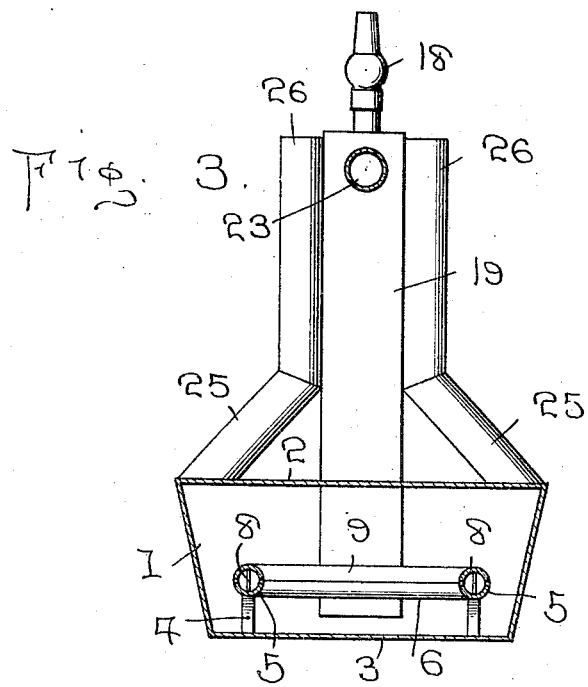
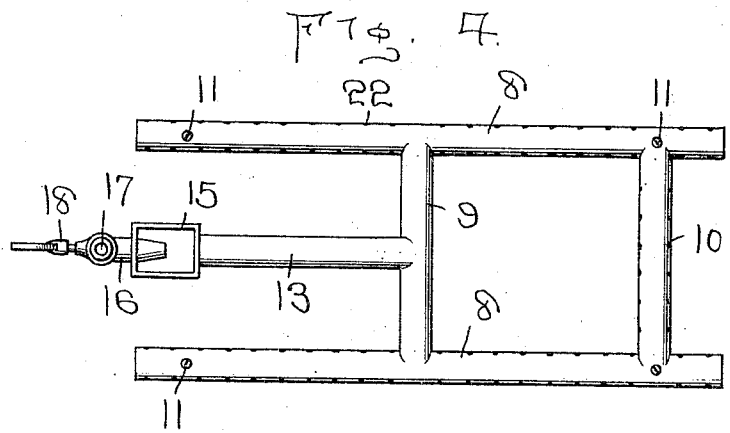
WITNESSES:
INVENTOR
M. B. Diskin
BY W. J. FitzGerald
Attorneys

UNITED STATES PATENT OFFICE.

MOSES B. DISKIN, OF NEW YORK, N. Y., ASSIGNOR, BY DIRECT AND MESNE ASSIGNMENTS, TO NATHAN KIRZSNER, OF NEW YORK, N. Y.

WATER-HEATER.

1,049,461.

Specification of Letters Patent.   Patented Jan. 7, 1913.

Application filed October 28, 1911. Serial No. 657,209.

*To all whom it may concern:*

Be it known that I, MOSES B. DISKIN, a citizen of the United States, residing at New York, in the county of New York and State of New York, have invented certain new and useful Improvements in Water-Heaters; and I do hereby declare the following to be a full, clear, and exact description of the invention, such as will enable others skilled in the art to which it appertains to make and use the same.

This invention relates to heaters and more particularly to water heaters.

An object of the invention is to provide a heater which may be positioned within a tank of water and heat the latter.

Another object is to provide a form of heater which may be readily connected to any gas supply pipe and placed within a body of water to quickly and thoroughly heat the water to the desired temperature.

Another object is to construct a water heater of this type having a main or body portion with the burner positioned therein and a gas and air mixing chamber at one end of the body portion while at the other end is located a pipe through which the gas may be readily ignited at the burner by the insertion of a lighted match or the like, the body portion also to have a plurality of hot air tubes projecting upwardly therefrom and a handle connecting the upper ends of the pipe and of a protecting casing surrounding the mixing chamber and extending upwardly from the body portion.

Other objects and advantages will be hereinafter set forth and pointed out in the specification and claim.

In the accompanying drawings which are made a part of this application, Figure 1 is a longitudinal sectional view through the complete device, Fig. 2 is a top plan view, Fig. 3 is a cross sectional view on the line 3—3 of Fig. 1, looking in the direction indicated by the arrows, and Fig. 4 is a detail view of the burner and mixing chamber removed.

Referring more particularly to the drawings in which similar reference numerals designate corresponding parts throughout the several views, 1 represents the main or body portion which may be of any form desired, but is preferably oblong and wider at the upper portion than at the lower portion. The body portion 1 is preferably provided with a flat top 2, and also a flat bottom 3, the purpose of which will presently appear.

Positioned within the main or body portion 1, and supported a short distance above the bottom 3 by means of the supporting legs 4 is the lower half of the burner which comprises parallel half pipes 5 connected by the half pipes 6 and 7, the half pipes 5 and 7 being provided with notches in their upper edges to register with similar notches in the edges of the parallel half pipes 8 and the connecting half pipes 10. The parallel half pipes 8 are also connected by the cross half pipe 9 which, however, is not provided with notches along its edges. The half pipes 8, 9 and 10 fit over the half pipes 6, 7 and 8 respectively, and are secured in position by suitable screws or bolts 11, thus forming the burner. The opposite ends of the parallel burner arms formed by the half pipes 5 and 8 are closed, thus preventing the escape of the mixture of air and gas except through the openings 22 formed by the registering notches.

Extending forwardly and parallel with the arms of the burner are the half pipes 12 and 13 projecting from the connecting half pipes 6 and 9 respectively, about midway the length of these connecting half pipes. The forward extremity of the half pipe 12 is enlarged to form the closed bottom 14 of the mixing chamber 15. The forward extremity of the half pipe 13 is also enlarged to form the upwardly extending portion of the mixing chamber, which portion rests upon the lower portion 14.

The upper end of the mixing chamber is open to allow the entrance of air into this chamber to mix with the gas entering by means of the reduced and turned end 16 of the gas pipe 17, which end is engaged in the front of the mixing chamber, as will be readily seen. The pipe 17 is provided with a suitable controlling valve 18 near its upper end to control the flow of gas through the pipe 17 to the mixing chamber and this pipe may be readily connected to any gas supply by a flexible tube or other connection upon the upper end thereof, adjacent the valve 18.

Projecting upwardly from the forward end of the casing 1 and inclosing the pipe 17 and the air and gas mixing chamber is the air directing pipe 19 which is preferably rectangular in cross section and flared toward its lower end. The pipe 17 has its forward or front side connecting with the front end of the casing 1 and is preferably formed integral therewith while the rear side and the wide sides connecting the front and rear sides extend through the top 2 of the casing 1 to a distance slightly below the bottom of the mixing chamber and slightly above the bottom of the casing 1, thus inclosing and protecting the mixing chamber and lower turned end of the pipe 17.

Extending upwardly from the rear end of the main or body portion 1 is the small pipe 20 having its lower end open and in communication with the interior of the body portion 1 and a removable cap 21 upon its upper end. This pipe permits of lighting the burner by means of a match, or the like, by inserting the same into this pipe to ignite the combustible mixture of gas and air finding its way through the small openings 22 formed by the registering notches in the edges of the two parts of the burner.

The pipe 20 and the air conducting pipe 19 are braced near their upper ends by the pipe or rod 23 having its opposite ends secured to the pipes 19 and 20, said bracing pipe serving as a handle for the heater.

An air supply pipe 24, for supplying air to the interior of the main or body portion 1 is located at the rear end of said body portion and the rear wall of the pipe is preferably integral with the rear wall of the main or body portion. The front and side walls of this pipe extend downwardly through the top 2 to a point below the burner and slightly above the bottom 3. As the opposite ends of the pipe 24 are opened, air will readily pass downwardly into the interior of the casing 1 to mix with the air and gas mixture as the same escapes through the burner openings 22, the air being drawn downwardly through this pipe and through the pipe 19 by suction created as the products of combustion escape through the products of combustion exit pipes as will be later described.

Projecting upwardly at an angle from each corner of the top 2 of the body 1 and directed transversely of the body portion is a products of combustion escape pipe or heating pipe 25. Each pipe 25 is continued at this angle until it reaches either the pipe 19 or the pipe 24, after which it is directed upwardly, as shown at 26 against the side of the pipe which it touches until it is about even with the upper end thereof. Both ends of the pipes 25 are opened and the products of combustion escape from the body portion 1 through these pipes, heating said pipes and the water or air surrounding the same.

Owing to the peculiar construction of the burner and its location within the body portion 1 and the points at which the escape pipes are positioned, it will be evident that a great quantity of heated products of combustion will find an outlet through the exit pipe 25, thoroughly heating the same and whatever may come in contact therewith.

By extending a portion of each front pipe 25 upwardly against a side of the air conducting pipes 19 and 24, the latter will be heated and consequently increase the temperature of the air traveling downwardly through the pipes 19 and 24 to the air and gas mixing chamber, thus supplying warm or heated air to the mixing chamber to mix with the gas entering the chamber from the reduced turned end 16 of the gas pipe 17 making a more readily combustible mixture for the burner, also supplying warm or heated air to the interior of the main or body portion 1 to mix with the air and gas as they escape from the burner openings to be ignited.

This heater is especially adapted for heating water within a tank, bath tub or the like, and is adapted to be placed within the water, the bottom 3 resting upon the bottom of the tank or other water containing device in which it is desired to heat a quantity of water. The upper end of the pipe 17, is connected by means of a flexible tube or other suitable connection, (not shown) to an ordinary gas jet or other pipe connecting with the source of supply gas and the valve 18 opened to allow the gas to travel downwardly through the pipe 17 and through the lower turned end 16 thereof into the mixing chamber. A suitable quantity of air will travel downwardly through the air supply pipe 19 and into the mixing chamber, thoroughly mixing with the gas. The mixture of air and gas will find its way from the mixing chamber through the pipe formed by the halves 12 and 13 and the connecting cross pipe formed by the halves 6 and 9 into the arms of the burner, escaping through the burner openings 22 formed by the registering notches in the halves of the burner. After the main or body portion 1 is filled with the combustible gases and the combustible gases have filled the pipe 20, the cover 21 thereof may be removed and the mixture ignited, after which the cap 21 may again be positioned. As the combustible mixture is consumed the products of combustion, will escape through the outlet pipes 25, heating the water surrounding said pipes and also heating the air pipes 19 and 24. The escaping of the products of combustion through the pipes 25 will create a suction and draw air downwardly through the air supply pipes 19 and 24 to the interior of the main or body portion 1, supplying the proper quantity of air to the burner to mix with the air and gas escaping through the openings 22. It will be noted that as the pipes 19 and 24 are heated by the hot products of combustion escaping through the pipes 25 to either side of the pipes 19 and 24 the air supplied to the mixing chamber and to the interior of the main or body portion 1 will be heated during its downward course through said air supply pipes, thus assisting in the consummation of the combustible mixture.

The heater may be readily placed in position or removed and transported from place to place by means of the connecting and bracing handle 23 and owing to the peculiar construction and arrangement of the various parts it will be evident that this heater will be comparatively cheap to manufacture and highly efficient in the performance of its duties.

What I claim is;

A device of the class described comprising a body portion, a burner within said body portion, a mixing chamber connected with one arm of said burner and having an upwardly directed open end, means for supporting the burner above the bottom of the body portion, a gas conducting pipe connected with the mixing chamber, an air inlet pipe communicating with one end of said body portion, extending some distance above the latter and inclosing said gas conducting pipe and said mixing chamber, a second air inlet pipe communicating with the opposite end of the body portion, an igniting tube projecting from the body portion adjacent one of said air inlet pipes, a removable cap for the upper end of said igniting tube, means for controlling the supply of gas to the mixing chamber for the burner, and outlet pipes communicating with said body portion adjacent the air inlet pipes.

In testimony whereof I have signed my name to this specification in the presence of two subscribing witnesses.

MOSES B. DISKIN.

Witnesses:
MORRIS ELIORICH,
JOACHIM H. GREEN SPAHNS.

---

Copies of this patent may be obtained for five cents each, by addressing the "Commissioner of Patents, Washington, D. C."